(12) United States Patent
Charopoulos et al.

(10) Patent No.: US 11,752,475 B2
(45) Date of Patent: Sep. 12, 2023

(54) FOOD PREPARATION APPLIANCE WITH LOCK

(71) Applicant: Vorwerk & Co. Interholding GmbH, Wuppertal (DE)

(72) Inventors: Philipp Charopoulos, Düsseldorf (DE); Niklas van Teeffelen, Velbert (DE); Felix Thies, Wuppertal (DE)

(73) Assignee: Vorwerk & Co. Interholding GmbH (DE)

( * ) Notice: Subject to any disclaimer, the term of this patent is extended or adjusted under 35 U.S.C. 154(b) by 1242 days.

(21) Appl. No.: 16/279,511

(22) Filed: Feb. 19, 2019

(65) Prior Publication Data

US 2019/0255494 A1 Aug. 22, 2019

(30) Foreign Application Priority Data

Feb. 21, 2018 (EP) .................................... 18157754

(51) Int. Cl.
| | |
|---|---|
| *B01F 27/80* | (2022.01) |
| *A47J 43/07* | (2006.01) |
| *B01F 33/45* | (2022.01) |
| *B01F 35/60* | (2022.01) |
| *A23N 12/02* | (2006.01) |

(52) U.S. Cl.
CPC .............. *B01F 27/80* (2022.01); *A23N 12/02* (2013.01); *A47J 43/0716* (2013.01); *B01F 33/45* (2022.01); *B01F 35/60* (2022.01)

(58) Field of Classification Search
CPC .... A47J 43/0465; A47J 43/046; A47J 43/085; A47J 43/0716; A47J 43/0722; A47J 43/0727; A47J 43/0766; A47J 43/08; A47J 2043/0449; A47J 43/0761; A47J 43/07; A23N 12/02; B01F 33/453; B01F 27/808; B01F 35/31; B01F 33/45; B01F 35/50; B01F 27/213; B01F 27/80; B01F 35/3213; B01F 35/60; B01F 27/2121; B01F 27/88; B01F 33/4531; B01F 35/6052
USPC .......................................................... 99/337
See application file for complete search history.

(56) References Cited

U.S. PATENT DOCUMENTS

| | | | | |
|---|---|---|---|---|
| 2,549,121 A | * | 4/1951 | Osterheld | ........... B01F 33/4534 310/104 |
| 3,596,692 A | * | 8/1971 | Swanke | ................. A47J 43/046 366/205 |
| 3,786,999 A | * | 1/1974 | Cabell | ................. A47J 43/0777 366/205 |

(Continued)

FOREIGN PATENT DOCUMENTS

| | | |
|---|---|---|
| EP | 02865304 A1 | 4/2015 |
| WO | 2013049881 A1 | 4/2013 |
| WO | WO-2017157965 A1 * 9/2017 | ............ A47J 43/046 |

*Primary Examiner* — David G Cormier
*Assistant Examiner* — Thomas Bucci
(74) *Attorney, Agent, or Firm* — Barnes & Thornburg LLP

(57) ABSTRACT

The present disclosure relates to a food preparation appliance comprising a rotatable tool for chopping and/or blending a food in a food preparation pot. The tool can be mounted for rotating and can be detachably connected to a shaft. The shaft can be at least partially outside the food preparation pot. A locking mechanism is provided for connecting the tool to the shaft in a locked manner. The locking of the tool to the shaft can take place automatically. The food preparation appliance can thus be cleaned with particularly little effort.

19 Claims, 2 Drawing Sheets

(56) References Cited

U.S. PATENT DOCUMENTS

Figure 1:
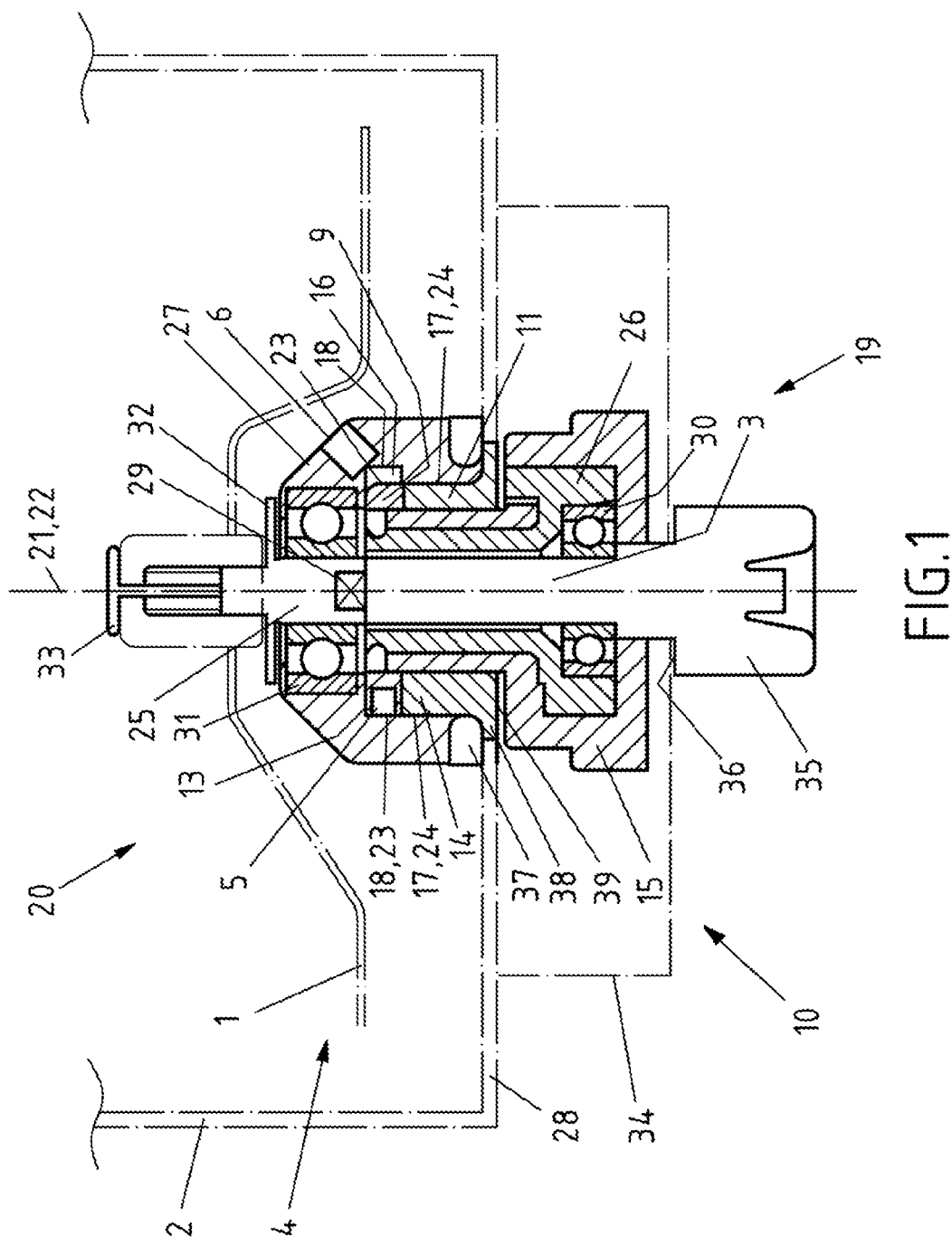

| | | | | |
|---|---|---|---|---|
| 4,600,155 A * | 7/1986 | Bos | ............... | A47J 43/046<br>241/37.5 |
| 4,734,604 A * | 3/1988 | Sontheimer | ............ | H02K 7/125<br>310/191 |
| 4,817,878 A * | 4/1989 | Shibata | ............... | A47J 43/046<br>403/349 |
| 5,393,142 A * | 2/1995 | Meier | ............... | B01F 33/4535<br>366/314 |
| 5,407,272 A * | 4/1995 | Meier | ............... | B01F 33/4535<br>366/314 |
| 6,065,865 A * | 5/2000 | Eyraud | ............... | B01F 33/4535<br>366/314 |
| 7,318,375 B2 * | 1/2008 | Huang | ............... | A47J 43/0777<br>366/205 |
| 8,087,818 B2 * | 1/2012 | Drees | ............... | A47J 43/085<br>366/205 |
| 9,277,841 B2 * | 3/2016 | Fevre | ............... | A47J 43/0716 |
| 9,283,528 B2 * | 3/2016 | Thai | ............... | B01F 27/808 |
| 2001/0002892 A1 * | 6/2001 | Karkos, Jr. | ............ | A23G 9/224<br>366/314 |
| 2002/0176320 A1 | 11/2002 | Wulf et al. | | |
| 2004/0076076 A1 * | 4/2004 | Hoobyar | ............... | B01F 33/453<br>366/273 |
| 2005/0178864 A1 * | 8/2005 | Unteregger | ............ | A47J 43/085<br>241/101.1 |
| 2010/0214867 A1 * | 8/2010 | Karkos, Jr. | ............ | A47J 43/085<br>366/273 |
| 2011/0013478 A1 * | 1/2011 | Athey | ............... | A47J 43/0766<br>366/205 |
| 2012/0006921 A1 * | 1/2012 | Maunoury | ............ | A47J 43/042<br>241/101.5 |
| 2012/0027331 A1 * | 2/2012 | Liang | ............... | F16C 33/7896<br>384/477 |
| 2012/0325948 A1 * | 12/2012 | Garcia | ............... | A47J 36/10<br>241/101.1 |
| 2013/0001220 A1 * | 1/2013 | Alet Vidal | ............ | A47J 43/0465<br>219/622 |
| 2014/0239107 A1 * | 8/2014 | Upston | ............... | A47J 43/0766<br>241/282.2 |
| 2014/0349385 A1 * | 11/2014 | Erdenberger | ............ | B01F 27/808<br>435/302.1 |
| 2015/0023130 A1 * | 1/2015 | Foxlee | ............... | A47J 43/085<br>366/205 |
| 2015/0117139 A1 * | 4/2015 | Conti | ............... | B01F 27/808<br>366/205 |
| 2016/0030900 A1 * | 2/2016 | Jin | ............... | A47J 31/00<br>261/84 |
| 2017/0086621 A1 * | 3/2017 | Bascom | ............... | A47J 43/0722 |
| 2017/0216788 A1 * | 8/2017 | Boettcher | ............ | B01F 27/91 |
| 2018/0008098 A1 * | 1/2018 | Koscak | ............... | A47J 43/0716 |
| 2018/0042427 A1 * | 2/2018 | Boozer | ............... | A47J 43/085 |
| 2018/0140138 A1 * | 5/2018 | Kim | ............... | A47J 43/07 |
| 2019/0038078 A1 * | 2/2019 | Hunt | ............... | A47J 43/046 |

* cited by examiner

FOOD PREPARATION APPLIANCE WITH LOCK

PRIORITY CLAIM

This application claims priority to European Application No. 18157754.5, filed Feb. 21, 2018, which application is hereby incorporated in its entirety herein.

FIELD OF THE DISCLOSURE

The present disclosure relates to a food preparation appliance comprising a rotatable tool for chopping and/or blending food in a food preparation pot. The tool to be rotated can be detachably connected to a shaft. The shaft is at least partially situated outside the food preparation pot. A locking mechanism for connecting the tool to the shaft is provided.

BACKGROUND

If components, such as a blending knife, come into direct contact with the food during the preparation of food, it must usually be ensured that these components can be properly cleaned. This frequently requires the removal or dismantling of individual components, because otherwise, dirty gaps cannot be cleaned sufficiently, for example. The removal or dismantling of individual components constitutes an additional effort for the user while cleaning, and frequently is a cause for incorrect use, for example due to the previously removed or dismantled component not being refitted or assembled according to plan.

The above-mentioned features, which are known from the prior art, can be combined, individually or in any combination, with any one of the subject matters and embodiments of the disclosure described below.

SUMMARY

Against this background, it is an object of the present disclosure to provide a correspondingly evolved locking mechanism.

A food preparation appliance according to the main claim and assemblies according to the independent claims serve for achieving the object. Advantageous embodiments are apparent from the dependent claims.

A food preparation appliance comprising a rotatable tool for chopping and/or blending a food in a food preparation pot serves for achieving the object, wherein the tool can, for rotating, be detachably connected to a shaft, which is or can be situated at least partially outside the food preparation pot. A locking mechanism is provided for connecting the tool to the shaft in a locked manner, wherein the locking can take place self-actingly (automatically).

The effort for connecting the tool to the shaft after a cleaning process and the risk of a faulty assembly can thus be reduced. The number of manipulations required for assembly can be reduced, and the assembly can be designed to be particularly easy. An increased safety due to the avoidance of errors is made possible. A food preparation appliance with a particularly high level of user comfort can thus be provided.

Preferably, the food preparation appliance is a food preparation device, such as an electric food processor, preferably with a heating member for heating the food in the food preparation pot. In principle, the food preparation appliance may also be an oven or cooking machine. During operation, food and/or an ingredient is inserted into the food preparation pot, and the food is prepared in the food preparation pot. Preparing a food means processing by means of blending, chopping and/or heating. Food may be solid or liquid. An ingredient, taken by itself, may also be a food, such as milk or drinking water. In the simplest case, a tool assembly and/or food preparation pot are a food preparation appliance.

The tool has an axis of rotation. In the operational state, the tool is non-rotatably connected to the shaft. In particular, the tool is a blending tool. Preferably, the tool has at least one radially projecting blade for chopping and blending. Preferably, the tool is formed from a knife assembly, in particular with four blades offset by 90°. For chopping and/or blending food in a food preparation pot, the tool is situated within the food preparation pot and is able there to rotate about the axis of rotation. If a tool can be detachably connected to a shaft for rotating, this means that the tool can be driven by the shaft in order to rotate for chopping and/or blending a food.

A shaft is a cylindrical rotary body. A shaft has an axis of rotation. Preferably, the shaft and the tool have the same axis of rotation. A shaft may have one or more shaft shoulders, for example for a ball-bearing seat or as a shielding means. A shaft which is situated at least partially outside the food preparation pot, preferably extends through a pot through-hole from the outside into the interior of the food preparation pot. Preferably, a sealing member is provided at the pot through-hole, so that no liquid escapes from the interior of the food preparation pot through the pot through-hole towards the outside. In particular, the pot through-hole extends through the pot bottom, preferably in the center of the pot bottom. The shaft may be connected to the tool via a coupling shaft detachably coupled to the shaft.

Outside the food preparation pot, the shaft may be driven by an electric motor of the food preparation appliance.

For example, the locking mechanism may be configured in a bayonet-like manner as follows, wherein an assembly comprising the locking mechanism described by way of example in this paragraph constitutes an independent aspect of the present disclosure. This assembly substantially consists of an upper part and a lower part. A bayonet-like locking mechanism for interlocking the upper part with the lower part is provided and configured in such a way that the upper part can be fitted onto the lower part in a non-rotatable manner only in a cover position of a locking element of the lower part. The locking element is then enclosed by the upper part and can be moved from the cover position into a locking position. In the locking position, a locking element protrusion of the locking element arrives in an undercut recess of the upper part, so that the upper part is interlocked with the lower part. The movement of the locking element from the cover position into the locking position can take place in a self-acting manner. The following embodiments not only relate to the food preparation appliance, but may also relate to this assembly comprising the bayonet-like locking mechanism.

In one embodiment, a magnet is provided, and the locking mechanism is configured such that the self-acting locking takes place due to a magnetic force of the magnet. A magnet can generate a magnetic field. A magnet is capable of magnetically attracting or repelling certain other bodies, e.g. including an iron content. Attraction or repulsion is effected by the magnetic force. Thus, a self-acting locking can be implemented particularly easily, as regards the design, and with particularly few components. A locking movement driven by magnetic force takes place in a self-acting manner, that is, during the locking movement, a user or a motor, for example, such as an electric motor, do not contribute to the drive force of the locking movement.

In particular, a magnet and another magnet movable relative thereto are provided. A magnetic force acting between the magnets can then cause a relative movement of the two magnets relative to one another, and thus the self-acting locking. Alternatively or additionally, a magnet and a magnetically attractable body movable relative thereto, e.g. a protrusion made of iron or including an iron content, are provided. A magnetic force acting between the magnet and the protrusion can then cause a relative movement, and thus the self-acting locking. Preferably, the magnet is a permanent magnet. In particular, the magnet is a ferromagnet. If several magnets are provided, at least one magnet of the several magnets is a ferromagnet in one configuration, e.g. in the form of a magnetically attractable body.

In one configuration, the locking mechanism is configured such that the self-acting locking takes place due to a spring. If, for example, the self-acting locking takes place due to a rotation of a locking element, this rotation may be driven by the spring. For example, the locking element and a pin member may in this case have an identical outer contour, wherein the locking element is rotatably disposed on the pin member. The pin member and/or the locking element are connected to the shaft. A retaining member may be provided in order to retain the locking element, against the spring force of the spring, in a cover position in which both outer contours of the locking element and the pin member cover each other axially. If an upper part comprising the tool is fitted in a positively non-rotatable manner onto the locking element and the pin member with an inner contour, the retaining member can thus be detached. Due to the spring force that is being released, the locking element can be rotated into an undercut recess of the upper part, so that the tool is interlocked in a self-acting manner with the shaft. In one embodiment, the food preparation appliance and/or the assembly are configured in such a way that the self-acting locking does not take place due to a spring force.

In one embodiment, an upper part, to which the tool is or can be attached, and a lower part comprising the shaft are provided. The locking mechanism is configured such that the self-acting locking for connecting the tool to the shaft in a locking manner takes place between the upper part and the lower part. Thus, a particularly comfortable and simple assembly of the tool and the shaft can be made possible without manually twisting them relative to one another. The user merely needs to fit the upper part axially onto the lower part.

Furthermore, it can thus be achieved that the lower part with the shaft can remain in the food preparation pot and that only the upper part comprising the tool is detached therefrom. Scraps of dough can thus be removed particularly easily from the pot bottom, and the upper part comprising the tool can be refitted for the next preparation step.

In one embodiment, a coupling shaft is provided, to which the tool is attached. The locking mechanism is configured such that the coupling shaft is axially coupled to the shaft, i.e. non-rotatably coupled thereto, when the tool is connected to the shaft in a locked manner. A locked connection of the tool with the shaft can thus by realized in a particularly comfortable manner by fitting the upper part onto the lower part within the food preparation pot. Preferably, the upper part comprises the coupling shaft. In particular, the coupling shaft is rotatably mounted in the upper part. Preferably, the lower part comprises the shaft. In particular, the shaft is mounted in the lower part. Preferably, the lower part is mechanically firmly connected to a food preparation pot in a manner detachable by the user.

In one configuration, the upper part comprises an upper-part housing. Preferably, a coupling shaft is mounted in the upper-part housing, in particular with a ball bearing, hereinafter referred to as the upper ball bearing. Preferably, the coupling shaft is axially fixed relative to the upper-part housing. Preferably, the tool is firmly attached to one end of the coupling shaft, i.e. not intended to be detached by the user or configured for non-destructive detachment.

In one configuration, the lower part comprises a lower-part housing. Preferably, the shaft is mounted in the lower-part housing, in particular with a ball bearing, hereinafter referred to as the lower ball bearing. In one configuration, an axial interlock between the upper-part housing of the upper part and a locking element of the lower part is effected. In one configuration, the lower part comprises a pin member for the non-rotatable connection to the upper-part housing of the upper part. In particular, the locking element and/or the pin member are disposed so as to be rotatable relative to the shaft. Preferably, the locking element and/or the pin member are disposed in an axially fixed manner relative to the lower-part housing. Preferably, the locking element is disposed in a rotatable manner relative to the lower-part housing.

In one embodiment, the lower part comprises at least one magnet and/or the upper part comprises at least one magnet. Thus, a self-acting locking by means of a relative locking movement between the lower part and the upper part, which is driven by a magnetic force between the lower part and the upper part, can be achieved. A particularly comfortable locking is thus achieved.

In particular, the magnet or a magnetically attractable body of the upper part is embedded into the upper-part housing of the upper part, preferably on an inner contour. Preferably, the magnet or a magnetically attractable body of the lower part is disposed in the locking element of the lower part. Preferably, the magnet or a magnetically attractable body of the lower part protrudes from an outer locking element contour, forms a locking element protrusion or is integrated into or embedded in a locking element protrusion. The outer locking element contour extends circumferentially, i.e. around the rotation axis. Thus, the outer locking element contour corresponds to a radial jacket surface.

In one embodiment, the locking mechanism is configured such that the self-acting locking takes place due to a self-acting rotary movement into a locking position. In the locking position, the tool is in the state of being connected to the shaft in a locked manner. According to this embodiment, the above-mentioned relative locking movement between the upper part and the lower part, or an upper-part housing and the locking element, for connecting the tool to the shaft in a locked manner is thus a self-acting rotary movement. A particularly compact construction can be realized in this manner. The self-acting rotary movement takes place around a rotation axis, which preferably corresponds to the axis of rotation.

In one embodiment, a locking element is provided and the locking mechanism is configured such that the locking element has arrived in an undercut recess when the locking element reaches the locking position due to the self-acting rotary movement, so that the tool is connected to the shaft in a locked manner. An undercut recess produces an axial undercut. In particular, the undercut recess forms an undercut which, in cross section, is U-shaped or ring-segment-shaped. It is thus possible to obtain a particularly reliable and rugged interlock. If the locking element rotates into an undercut recess for the locked connection, the locking element rests on a radial supporting structure, so that an axial displacement is prevented by the radial supporting structure. Preferably, the supporting structure is a shoulder which is, in particular, U-shaped or ring-segment-shaped, in particular in the circumferential direction adjacent to a pin member protrusion. Before the locking element is located in the undercut recess and after the locking element has left the undercut recess, an axial displacement of the locking element relative to the lower part or lower-part housing is preferably possible again.

In one embodiment, the lower part comprises the locking element and/or the upper part comprises the undercut recess. Thus, the lower part can be connected to the upper part in a locked manner particularly ruggedly and reliably. In particular, the upper-part housing comprises the undercut recess. The undercut recess is radially defined by the inner contour of the upper-part housing. Preferably, the inner contour is defined by a cylindrical jacket surface. In that case, the undercut recess is present where the entrance contour has a smaller radius than the inner contour and thus forms a radially extending shoulder or a supporting structure.

In one embodiment, the locking element can rotate relative to an axially adjacent pin member. The locking mechanism is configured such that, in a cover position of the locking element, the pin member axially covers the locking element. It is thus made possible to rotate, in both rotation directions, a tool which is particularly reliably connected to the shaft in a locked manner. Axial and radial relate to the rotation axis of the self-acting rotary movement. Axially covering means that an outer pin member contour completely covers an outer locking element contour in the covering position, viewed in the axial direction. In other words, the outer locking element contour at no point protrudes radially from the outer pin member contour. Just like the outer locking element contour, the outer pin member contour also extends circumferentially, i.e. corresponds to a radial jacket surface. In particular, the outer pin member contour is limited to an axial region, which, in the state of the tool of being connected to the shaft in a locked manner, is in engagement with the upper part, particularly the upper-part housing. In one configuration, the outer pin member contour and the outer locking element contour are, in the cover position, congruent in cross-section, and correspondingly offset in the locking position.

In one embodiment, the lower part comprises the pin member and/or the locking element is axially disposed between the pin member and the upper part. Thus, the lower part can be particularly ruggedly connected to the upper part in a locked manner, and the pin member can at the same time be used for anchoring to a food preparation pot, preferably by means of a positively non-rotatable connection. For this purpose, the pin member may have a star shape. Furthermore, a bilaterally axial fixing is possible with a particularly compact construction by means of the locking element.

In one embodiment, the upper part comprises a recessed portion for receiving the pin member and the locking element, wherein the recessed portion has an entrance contour for non-rotatably receiving the pin member and/or an inner contour for permitting the self-acting rotary movement from the cover position into the locking position. An entrance contour for non-rotatably receiving the pin member is adapted to the outer pin member contour for producing a positively non-rotatable connection. "Positively non-rotatable connection" means that a contour which is circumferentially not rotationally symmetric can be displaced, in an axially guided manner, relative to a correspondingly formed counter-contour, but is non-rotatably coupled at the same time. In the received state, at least one radial pin member protrusion, which forms an outer pin member contour that is not rotationally symmetric, extends into a radial recess of the recessed portion in order to establish the positively non-rotatable connection. The entrance contour forms the entrance to the recessed portion and preferably extends axially to the inner contour.

In the state of the upper part being fitted on the lower part, the locking element and the cover element are received in the recessed portion. In the state of being connected in a locked manner, the upper part, in the fitted state, is located on the lower part. In the fitted state, the inner contour relates to the axial region of the recessed portion across which the locking element extends. In the fitted state, the entrance contour relates to the axial region of the recessed portion across which the pin member extends within the recessed portion.

In one embodiment, the pin member, in the cover position of the locking element, axially covers, with a radial pin member protrusion, a radial locking element protrusion of the locking element. It is thus possible to obtain a particularly smooth fitting process of the upper part onto the lower part with non-rotatable fixing by means of the pin member protrusion, with, at the same time, a possibility for locking by means of the locking element protrusion. The pin member protrusion is formed by the outer pin member contour and/or the locking element protrusion is formed by the outer locking element contour. The radial pin member protrusion serves for the non-rotatable connection to the upper part, to which the tool is attached. The radial locking element protrusion serves for the axial connection to the upper part, particularly by means of the undercut recess of the upper part.

In one embodiment, the entrance contour of the recessed portion of the upper part is adapted for axially guiding the pin member protrusion, such that the pin member can be non-rotatably received in the upper part. Thus, the entrance contour of the recessed portion is positively non-rotatably connected to the pin member protrusion when the pin member is accommodated in the recessed portion.

When the upper part is fitted onto the locking element and the pin member, preferably, the locking element first passes the entrance contour of the recessed portion, which in the cover position does not radially protrude over the outer pin member contour. At least one locking element protrusion passes the entrance contour in the process, which is adapted to the entrance contour for producing a positively non-rotatable connection.

If the pin member is also accommodated by the recessed portion and the locking element protrusion reaches the inner contour of the recessed portion, at least one such locking element protrusion can be rotated into the undercut recess and thus be moved into the locking position. In particular, the undercut recess is provided in the form of a radial recess which extends across the axial region of the inner contour and ends in the region of the entrance contour, i.e. is not present in the region of the entrance contour. A radial supporting structure, which permits the locking element to be axially supported in the locking position in the direction of the pin member, can thus be produced.

In one embodiment, a returning element for disengaging, i.e. for unlocking, the locked connection of the tool to the shaft is provided. Thus, the user is able to detach the upper part from the lower part in a particularly comfortable manner. In particular, the returning element for disengaging the locked connection of the tool to the shaft is actuated manually or by means of an actuating motor.

Preferably, the returning element for disengaging the locked connection of the tool to the shaft is actuated by means of a rotary movement, preferably in a direction of rotation opposite to the self-acting rotary movement, in particular from the cover position into the locking position. Preferably, the locking element is moved from the locking position into the cover position by actuating the returning element. In particular, the returning element can be actuated from outside the food preparation pot and/or from underneath the pot bottom.

Another aspect of the disclosure relates to a tool assembly or a food preparation pot comprising the tool assembly for a food preparation appliance, in particular in accordance with the aspect of the disclosure described in the introduction. The tool assembly is equipped with a rotatable tool for chopping and/or blending food in a food preparation pot. The tool can, for rotating, be detachably connected to a shaft, which may be at least partially situated outside the food preparation pot. A locking mechanism for connecting the tool to the shaft in a locked manner is provided. Locking may take place in a self-acting manner. In particular, the tool assembly comprises, or consists of, the upper part and the lower part. Accordingly, the features, embodiments and effects of the assembly or the food preparation appliance described in the introduction for achieving the object also relate to this tool assembly and this food preparation pot.

Another aspect of the present disclosure relates to an assembly, in particular to a tool assembly, a food preparation pot or a food preparation appliance according to any one of the preceding aspects of the disclosure. The assembly comprises an upper part and a lower part. A bayonet-like locking mechanism for interlocking the upper part with the lower part is provided. The bayonet-like locking mechanism is configured in such a way that the upper part can be fitted onto the lower part in a non-rotatable manner only in a cover position of a locking element of the lower part. The locking element is then enclosed by the upper part and can be moved from the cover position into a locking position. In the locking position, a locking element protrusion of the locking element arrives in an undercut recess of the upper part, so that the upper part is connected to the lower part in a locked manner. The movement of the locking element from the cover position into the locking position can take place in a self-acting manner. "Fitted on" means pushed on in a guided manner in order to enclose. The upper part is fitted onto the lower part axially, i.e. in the direction of the rotation axis. Accordingly, the features, embodiments and effects of the assembly or the food preparation appliance described in the introduction for achieving the object also relate to this tool assembly and this food preparation pot.

Exemplary embodiments described hereinafter will be explained in more detail with reference to Figures. One or more features of these examples may be combined with the above-described aspects of the invention and its various embodiments. The claimed scopes of protections are not limited to the examples shown.

BRIEF DESCRIPTIONS OF THE DRAWINGS

Figure 2:
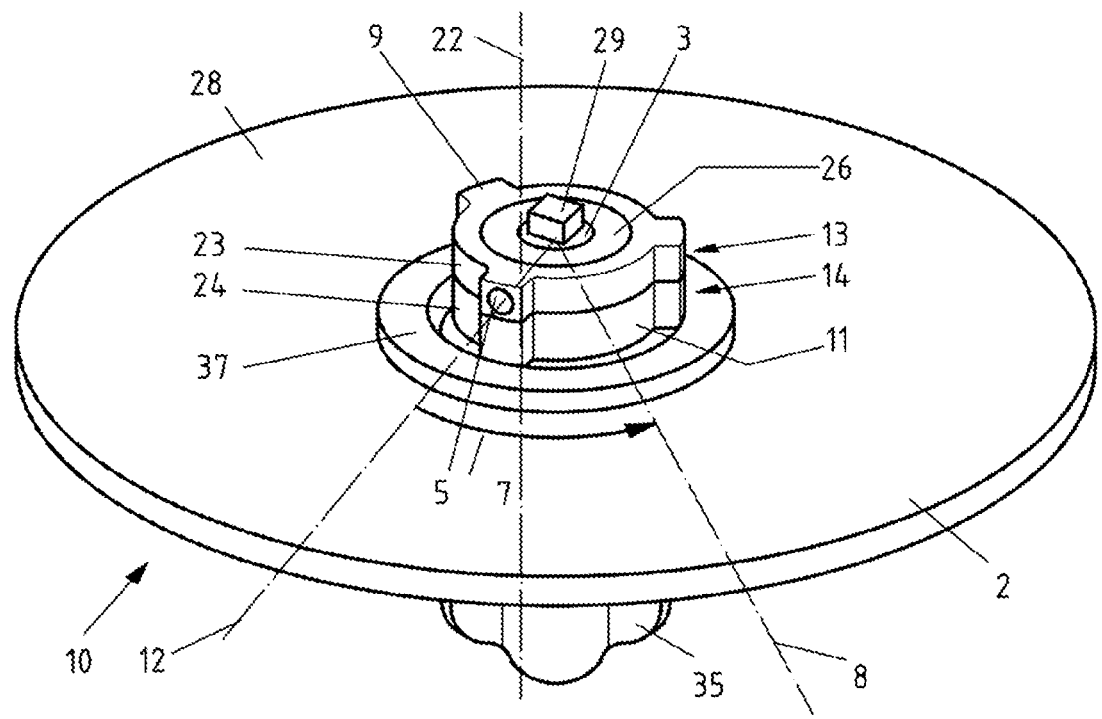
Figure 3:
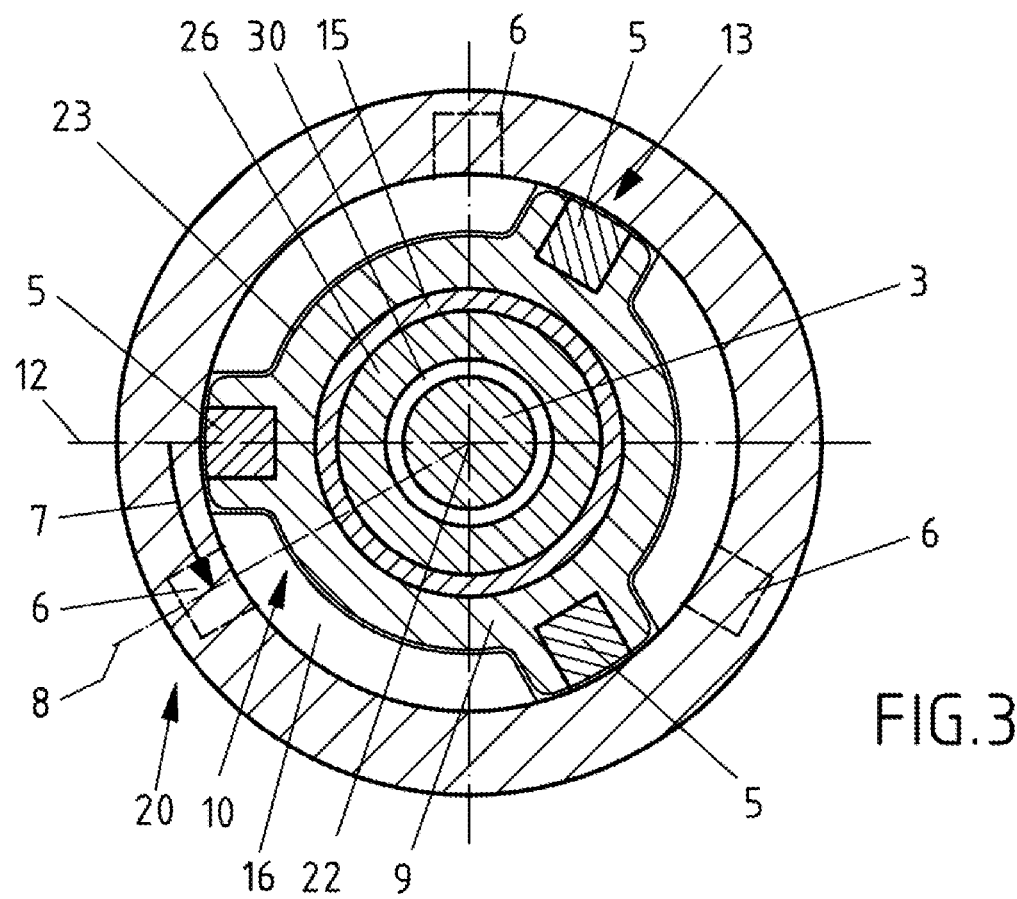

In the Figures:

FIG. 1: shows a schematic longitudinal sectional view of an exemplary embodiment of the present disclosure;

FIG. 2: shows a schematic illustration of a lower part connected to a pot bottom; and FIG. 3: shows a schematic cross-sectional view through an upper part and a lower part in the fitted state.

DETAILED DESCRIPTION

FIG. 1 shows a tool 1 for blending and/or chopping in the state of being connected to the shaft 3 in a locked manner. The shaft 3 extends through a pot bottom 28 of a food preparation pot 2 indicated by dashed lines, and can transmit a torque from an electric motor, which is not shown, onto the tool 1, so that the tool 1 is able to rotate about an axis of rotation 21 within the food preparation pot 2, for blending and/or chopping food, which is not shown. Preferably, the tool 1 is equipped with at least two or four radial blades or a knife assembly. The tool 1 is attached at the upper end of a coupling shaft 25 by means of a tool fixing means 33, in particular by means of a screw connection and a rivet connection for fixing the screw connection. A bilaterally reliable rotary operation is thus made possible.

The coupling shaft 25 is mounted in an upper-part housing 27 in a rotatable and axially fixed manner by means of an upper ball bearing 31. In order to protect the interior of the upper-part housing 27 and the mounting from becoming dirty, a shielding means 32 is provided, in particular in the form of a radial collar, directly above them on the coupling shaft 25. A coupling contour for a coupling connection 29 to the shaft 3 is formed at the lower end of the coupling shaft 25. In particular, the coupling connection 29 is a positively non-rotatable connection. Preferably, the coupling contour of the coupling shaft 25 is a depression into which a corresponding counter-contour of the upper end of the shaft 3 can be inserted in order to form the positively non-rotatable coupling connection 29, as shown in FIG. 1. For example, the depression has a quadrilateral or square cross-section, and the counter-contour has a corresponding quadrilateral shape. The upper-part housing 27, the coupling shaft 25 and the upper ball bearing 31 substantially form a joint assembly group, which is referred to as the upper part 20. The upper-part housing 27 delimits and defines an inner recessed portion 16, 17, 18, which is open in a downward direction, so that the upper part 20 can be axially fitted onto another assembly group, which is referred to as the lower part 10.

In one configuration, the upper part 20, in the fitted state, encloses a part of a lower part 10 located within the food preparation pot 2. An annular sealing member 37 is provided for sealing in a moisture-tight manner the annular underside of the upper-part housing 27 in the fitted or operational state towards the pot bottom 28.

The lower part 10 comprises the shaft 3, a lower-part housing 26 and a lower ball bearing 30, which is firmly seated in the lower-part housing 26, for mounting the shaft 3 in a rotatable and axially fixed manner. Within the food preparation pot 2, the lower part 10 has a locking element 9, which can be rotated, relative to a pin member 11 of the lower part 10, which is disposed thereunder, about a rotation axis 22 extending parallel or along the axis of rotation 21. The pin member 11 partially extends through a pot through-hole 39, i.e. through opening, in the pot bottom 28. An anchoring contour 38, which is not rotationally symmetric, of this part of the pin member 11 located within the pot through-hole provides for a positively non-rotatable connection by engaging with a correspondingly formed through-hole contour, i.e. a contour of a through-hole. In particular, the anchoring contour 38 and the through-hole contour are star-shaped. A returning element 15 which, in particular, encloses the lower-part housing 26, extends from outside and below the food preparation pot 2 through the pot through-hole 39 up to the locking element 9. In the case of a rotation of the returning element 15 about the rotation axis 22, the locking element 9 can be taken along, so that the locking element 9 is able to rotate about the rotation axis 22 via the returning element 15. In particular, the lower-part housing 26 also extends through the pot through-hole 39. As it were, the lower-part housing 26 and the returning element 15, together with the shaft 3, extend in the direction of the rotation axis 22 through a corresponding opening in the pin member 11 and the locking element 9. Preferably, the lower-part housing 26 and/or the returning element 15 extend up to a top side of the locking element 9. The recessed portion 16, 17, 18 of the upper part 20 is so deep that, in the upper region of the upper part 20, only the shaft 3 is in axial contact with the connecting shaft 25 in the fitted state, but not the top side of the locking element 9, the lower-part housing 26 or the returning element 15, in order to avoid redundant constraints. Further, axial manufacturing tolerances of the upper-part housing 27 are compensated by the elasticity of the sealing member 37 towards the pot bottom 28. The underside of the lower part 10 forms a coupling device 35 of the shaft 3, which, underneath the lower-part housing 26, is radially widened with a circumferential contour that is not rotationally symmetric, preferably a star-shaped contour.

Together, the lower part 10 and the upper part 20 form a tool assembly 19. The tool assembly 19 can be firmly, but detachably, connected to a food preparation pot 2 and thus form a joint unit. For example, a clamping member 34, which is indicated by dashed lines, may be provided in order to connect the lower part 10 to the underside of the pot bottom 28 and/or to clamp them together such that, in the state of being connected in a locked manner, the upper part 20 and the lower part 10 press the sealing member 37 on the top side of the pot bottom 28 onto the pot bottom. In particular, the clamping member 34 is in engagement with the lower-part housing 26 and/or the pin member 11. Preferably, the clamping member 34, preferably in a wedge-like manner, reaches between the underside of a radially protruding region of the anchoring contour 38 and the top side of a radial engagement boom of the lower-part housing 26, which is not shown here and which is preferably axially congruent with the radially protruding region of the anchoring contour 38. The shoulder 36 is spaced apart from the clamping member 34, so that it is possible to rotate the shaft 3 unimpededly. Thus, the pot bottom 28 can be clamped between the upper part 20 and the lower part 10, and an axial fixing can be obtained. In cooperation with the pot through-hole 39 of the pot bottom 28, the anchoring contour 38 provides for non-rotatable fixing.

The lower part 10 and the upper part 20 form an assembly, wherein a bayonet-like locking mechanism 4 for interlocking the upper part 20 with the lower part 10 is provided. The locking mechanism 4 provides that the upper part 20 can be non-rotatably fitted onto the lower part 10 only in a cover position 12 of the rotatable locking element 9, in which the outer pin member contour 24, as shown in FIG. 1, axially covers the outer locking element contour 23. For this purpose, the recessed portion of the upper-part housing 27 has an entrance contour 17 along the edge of the open underside, which comprises a counter-contour for the outer pin member contour 24 for producing a positively non-rotatable connection. Thus, the locking element 9, when the upper part 20 is fitted, can pass the entrance contour 17 together with the pin member 11 only if the outer locking element contour 23 and the outer pin member contour 24 are disposed one above the other in such a way that they can both be axially pushed through the entrance contour 17. Thus, the locking element 9 can be enclosed by the upper part 20 and reach an inner contour 18 of the recessed portion that is axially adjacent to the entrance contour 17. The inner contour 18 forms a recess 16 which, compared to the entrance contour 17, is axially undercut. Thus, the locking element 9 is no longer fixed in a positively non-rotatable manner when reaching the inner contour 18, but, due to the undercut recess 16, is capable of rotating or being rotated about the rotation axis 22. A radial locking element protrusion 13 of the locking element 9, which was able to pass the entrance contour 17 up to the inner contour 18 when it was, in particular, flush on a pin member protrusion 14 in the cover position 12, is now able to end up in the undercut recess 16 of the upper part 20 and thus connect the upper part 20 to the lower part 10 in a locked manner. This rotational orientation of the locking element is referred to as the locking position 8, which is shown in the FIGS. 2 and 3.

As the FIGS. 1 to 3 show, the locking element 9 comprises a magnet 5, namely on the locking element protrusion 13, preferably embedded into the locking element protrusion 13. At the same time, the upper-part housing 27 also comprises a magnet 6, as the FIGS. 1 and 3 show. The magnet 6 of the upper part 20 is disposed at the undercut recess, and thus in the locking position 8, and is also preferably embedded into the upper-part housing 27 at that location. In particular, the magnet 6 is orientated axially above the locking element 9 and/or obliquely relative to the rotation axis 22 in order to obtain as large a distance as possible to the pin member 11 in order to avoid magnetic field interference. The two magnets 5 and 6 are capable of mutually attracting each other by magnetic force. When the upper part 20 is fitted onto the lower part 10, and the locking element 9 situated in the cover position 12 leaves the entrance contour 17 and has reached the inner contour 18, the magnet 6 of the upper part 20 at the undercut recess 16 pulls the magnet 5 of the locking element protrusion 13, which is situated in the cover position 12, towards it into the undercut recess 16, and thus into the locking position 8. This rotary movement 7, which is shown in the FIGS. 2 and 3, thus takes place in a self-acting manner without any action by the user, by a motor or by an electronic device. Thus, the locking takes place in a self-acting manner.

FIG. 2 shows the lower part 10 inserted into the pot through-hole 39 of the pot bottom 28 from below. The rest of the food preparation pot 2 is hidden. A coupling connection 29 with the hidden coupling shaft 25 can be made possible by means of the illustrated quadrilateral contour at the upper end of the shaft 3. The locking element 9 is located in the cover position 12 relative to the pin member 11. The locking element 9 and the pin member 11 have congruent outer contours 22, 23. At least two and/or at most twelve, preferably exactly three, circumferentially evenly distributed locking element protrusions 13 and/or pin member protrusions 14 are provided, which radially protrude from a circumferential surface that is otherwise shaped, in particular, cylindrically. The locking element 9 can move from the cover position 12 into the locking position 8 by means of a counter-clockwise rotary movement 7.

In an alternative configuration as shown in FIG. 2, the coupling shaft 25 could basically extend through the pot through-hole in the pot bottom 28. However, when detaching the tool 1 from the shaft 3, this could result in the coupling shaft 25 being removed from the pot through-hole, so that a liquid part of the food could leak downwards through the pot through-hole 39 or at least end up in the interior of the lower-part housing 26. Therefore, this alternative configuration is not preferred.

The schematic cross-sectional view in FIG. 3 through the region of the inner contour of the recessed portion in the state of the upper part 20 being fitted onto the lower part 10 schematically illustrates the position and orientation of the magnets 6 of the upper part 20, which are projected into the plane of the magnets 5 of the locking element 9 for illustrative purposes and are therefore depicted with dashed lines. For the self-acting locking, the magnets 5 and 6 attract each other in such a way that the locking element 9 carries out the rotary movement 7 in a counter-clockwise direction from the cover position 12 into the locking position 8 about the rotation axis 22.

It is thus sufficient for assembling of the upper part 20 and the lower part 10 if the user fits the upper part 20 onto the lower part 10. In order to detach the upper part 20 from the lower part 10, the user actuates the returning element 15 on the underside to rotate the locking element 9 into the cover position 12 with the pin member 11, so that the upper part 20 can be axially pulled off from the lower part.

The assembly may be a bayonet lock. Generally, a bayonet lock substantially consists of two assembly groups, such as, in the present case, the upper part 20 and the lower part 10. In particular, the lower part 10 comprises a rigid pin member 11 with an outer pin member contour 24 that is not rotationally symmetric. In this case, "outer contour" means the circumferential contour in a cross section relative to the axis of rotation 21 or the rotation axis 22. A locking element 9 is located on the pin member 11, mounted rotatably thereon and having the same circumferential outer contour and the same cross section. In particular, the pin member 11 and the locking element 9 have a constant cross section in the direction of the axis of rotation 21 or the rotation axis 22. At least one magnet 5, preferably three magnets 5, are located on the outer locking element contour 23. Preferably, the magnet 5 is embedded in the radial locking element protrusion 13 or forms the locking element protrusion 13. The locking element 9 can take two different positions on the pin member 11, the cover position 12 and the locking position 8. In the cover position 12, the outer pin member contour 24, which is not rotationally symmetric and, in particular, star shaped, and the outer locking element contour 23 are congruent, and in the locking position, they are twisted relative to one another. The second assembly group or upper part 20 comprises a recessed portion 16, 17, 18 with radial recesses of an entrance contour 17, which is complementary to the outer locking element contour 23 and the outer pin member contour 24 of the lower part 10. The upper part 20 also comprises at least one magnet 6, preferably three magnets 6. If the pin member 11 and the locking element 9 of the lower part 10 are located in the cover position 12, then the upper part 10 can be fitted onto the lower part 20.

If the locking element 9 is rotated when the upper part 20 is fitted, the former reaches into an undercut recess 16 in or on the upper part 20, so that a separation of the upper part 20 and the lower part 10 is prevented. In this case, the pin member 11 prevents a relative rotation of the upper part 20. The rotation of the locking element 9 is caused by the attractive forces between the magnets 5, 6 of the upper part 20 and the lower part 10. If the magnets 5, 6 of the upper part 20 and the lower part 10, viewed in the direction of the rotation axis 22, are located, in particular centered, on a common radial line towards the rotation axis 22, then the locking element 9 is located in the locking position 8. The magnets 5, 6 have then come closest to each other, are aligned relative to one another and/or are situated opposite each other or one in front of the other. Via a returning element 15, the locking element 9 is accessible for the user from the outside, so that the locking element 9 can thus be turned back against the magnetic force, and the locking element 9 can be returned into the cover position 12. Then, the upper part 20 can again be removed from the lower part 10 in an upward direction. In this manner, it can be made possible that two assembly groups to be connected, such as an upper part 20 and a lower part 10, can be positively fixed by means of a bayonet lock without having to be manually rotated relative to one another by the user or a motor. Instead, the engagement of the assembly groups to be connected takes place in a self-acting or automatic manner.

In particular, the FIGS. 2 and/or 3 show supplementary illustrations of the exemplary embodiment of FIG. 1.

The invention claimed is:

1. A food preparation appliance comprising
a rotatable tool configured to chop or blend a food in a food preparation pot, the rotatable tool including a coupling shaft,
wherein the tool is detachably connected to a shaft via the coupling shaft, the shaft being at least partially outside the food preparation pot, wherein a locking mechanism is provided for connecting the tool to the shaft in a locked manner, wherein the locking can take place self-actingly,
wherein an upper part and a lower part form together with the rotatable tool a tool assembly that can be firmly and detachably connected to the food preparation pot at a pot bottom of the food preparation pot by inserting the lower part into a pot through-hole of the pot bottom, and
wherein the coupling shaft is included in the upper part and is attached to the rotatable tool, and the shaft is included in the lower part and can be connected to an electric motor of the food preparation appliance below the food preparation pot to transmit a torque to the shaft of the lower part and from the shaft of the lower part to the coupling shaft of the upper part and from the coupling shaft of the upper part to the tool, and the locking mechanism is configured such that the self-acting locking for connecting the tool to the shaft in a locking manner takes place between the upper part and the lower part to move the locking mechanism from an unlocked state to a locked state without requiring a user to drive all such movement, such that in a locked state, chopping or blending of food with the rotatable tool can be conducted in the food preparation pot, while in the unlocked state, the lower part with the shaft can remain in the food preparation pot and only the upper part with the tool can be detached therefrom.

2. The food preparation appliance of claim 1, wherein the lower part comprises at least one magnet.

3. The food preparation appliance of claim 1, wherein the locking mechanism is configured such that the coupling shaft is axially coupled to the shaft when the tool is connected to the shaft in a locked manner.

4. The food preparation appliance claim 1, wherein the locking mechanism is configured such that the self-acting locking takes place due to a self-acting rotary movement into a locking position.

5. The food preparation appliance of claim 4, wherein a locking element is provided and the locking mechanism is configured such that the locking element has arrived in an undercut recess formed in the upper part when the locking element reaches the locking position due to the self-acting rotary movement, so that the tool is connected to the shaft in a locked manner while blending or chopping food.

6. The food preparation appliance of claim 5, wherein the lower part comprises the locking element.

7. The food preparation appliance of claim 5, wherein the locking element is capable of rotating relative to an axially adjacent pin member, and the locking mechanism is configured such that, in a cover position of the locking element, the pin member axially covers the locking element.

8. The food preparation appliance of claim 7, wherein the lower part comprises the pin member and the locking element is axially disposed between the pin member and the upper part.

9. The food preparation appliance of claim 7, wherein the upper part comprises a recessed portion for receiving the pin member and the locking element, wherein the recessed portion has an entrance contour for non-rotatably receiving the pin member and an inner contour for permitting the self-acting rotary movement from the cover position into the locking position.

10. The food preparation appliance of claim 9, wherein the pin member, in the cover position of the locking element, axially covers, with a radial pin member protrusion, a radial locking element protrusion of the locking element.

11. The food preparation appliance of claim 10, wherein the entrance contour of the recessed portion of the upper part is shaped for axially guiding the pin member protrusion, such that the pin member can be non-rotatably received in the upper part.

12. The food preparation appliance of claim 1, wherein a returning element for disengaging the locked connection of the tool to the shaft is provided.

13. The food preparation appliance of claim 2, wherein the upper part comprises at least one magnet.

14. The food preparation appliance of claim 5, wherein the lower part comprises the locking element and the upper part comprises the undercut recess.

15. The food preparation appliance of claim 6, wherein the locking element is capable of rotating relative to an axially adjacent pin member, and the locking mechanism is configured such that, in a cover position of the locking element, the pin member axially covers the locking element.

16. The food preparation appliance of claim 1, wherein a magnet is provided and the locking mechanism is configured such that the self-acting locking takes place due to a magnetic force of the magnet or due to a spring.

17. The food preparation appliance of claim 1, wherein the shaft is in direct contact and directly connected to the coupling shaft for the torque transmission in the locked state, wherein one of the shaft or coupling shaft extends through the pot bottom via the pot through-hole.

18. A food preparation appliance, the food preparation appliance comprising
  a food preparation pot,
  a drive shaft mounted for rotation about an axis, the drive shaft arranged to extend through the pot so as to be disposed partially outside the food preparation pot and partially inside the food preparation pot,
  a tool mounted inside the food preparation pot for rotation about the axis, the tool coupled to the drive shaft so as to be driven about the axis by the drive shaft, and
  a lock mechanism configured to fix the tool in place relative to the drive shaft along the axis, the lock mechanism including a lower part coupled to the food preparation pot and an upper part coupled to the tool to allow rotation of the tool relative to the lower part, the upper part including magnets that are magnetically attracted to magnets included in the lower part so as to self-actingly encourage movement of the lock mechanism from an unlocked state to a locked state without requiring a user to drive all such movement such that in a locked state, chopping or blending of food with the rotatable tool can be conducted in the food preparation pot, while in the unlocked state, the lower part can remain in the food preparation pot and only the upper part with the tool can be detached therefrom.

19. The food preparation appliance of claim 18, wherein the lower part of the lock mechanism is mounted for rotation about the axis and the lower part of the lock mechanism is configured to rotate about the axis during movement from the unlocked state to the locked state.

* * * * *